(12) United States Patent
Yasuda et al.

(10) Patent No.: US 8,101,539 B2
(45) Date of Patent: Jan. 24, 2012

(54) PURIFYING CATALYST

(75) Inventors: Hirofumi Yasuda, Yokosuka (JP);
Yasunari Hanaki, Yokohama (JP); Toru Sekiba, Yokohama (JP); Shigeru Chida, Yokosuka (JP); Junji Ito, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 49 days.

(21) Appl. No.: 12/747,067

(22) PCT Filed: Nov. 20, 2008

(86) PCT No.: PCT/JP2008/071111
§ 371 (c)(1),
(2), (4) Date: Jun. 9, 2010

(87) PCT Pub. No.: WO2009/078246
PCT Pub. Date: Jun. 25, 2009

(65) Prior Publication Data
US 2010/0273646 A1 Oct. 28, 2010

(30) Foreign Application Priority Data

Dec. 14, 2007 (JP) .................................. 2007-322940
Oct. 1, 2008 (JP) .................................. 2008-256519

(51) Int. Cl.
*B01J 23/00* (2006.01)
*B01J 21/00* (2006.01)
*B01J 20/00* (2006.01)

(52) U.S. Cl. ........ 502/302; 502/244; 502/245; 502/258; 502/259; 502/260; 502/303; 502/304; 502/314; 502/315; 502/316; 502/318; 502/324; 502/327; 502/335; 502/336; 502/337; 502/338; 502/345; 502/349; 502/350; 502/415; 502/439; 502/527.12; 502/527.13

(58) Field of Classification Search ............... 502/244, 502/245, 258–260, 302–304, 314–316, 318, 502/324, 327, 335–338, 345, 349, 350, 415, 502/439, 527.12, 527.13
See application file for complete search history.

(56) References Cited

U.S. PATENT DOCUMENTS 4,927,799 A * 5/1990 Matsumoto et al. .......... 502/303
(Continued)

FOREIGN PATENT DOCUMENTS
EP 1 839 745 A1 10/2007
(Continued)

OTHER PUBLICATIONS

M. Machida et al., $MnO_x$—$CeO_2$ Binary Oxides for Catalytic $NO_x$ Sorption at Low Temperatures. Sorptive Removal of $NO_x$, *Chemistry Materials*, vol. 12, No. 10, (2000) pp. 3158-3164.

*Primary Examiner* — Cam N Nguyen
(74) *Attorney, Agent, or Firm* — Foley & Lardner LLP

(57) ABSTRACT

A purifying catalyst includes catalyst powder composed of a transition metal oxide of which an average particle diameter is within 1 nm to 2 µm and in which an electron binding energy of oxygen is shifted to an energy side lower than 531.3 eV. The purifying catalyst shows good purification performance even when noble metal is not contained as an essential component.

7 Claims, 4 Drawing Sheets

U.S. PATENT DOCUMENTS

| | | | |
|---|---|---|---|
| 5,075,276 A * | 12/1991 | Ozawa et al. | 502/304 |
| 6,060,420 A | 5/2000 | Munakata et al. | |
| 6,129,862 A | 10/2000 | Munakata et al. | |
| 6,309,758 B1 * | 10/2001 | Schmidt | 428/570 |
| 6,395,403 B2 * | 5/2002 | Schmidt | 428/570 |
| 6,649,562 B2 * | 11/2003 | Naka et al. | 502/343 |
| 6,660,680 B1 * | 12/2003 | Hampden-Smith et al. | 502/180 |
| 6,911,278 B2 * | 6/2005 | Hiroshima et al. | 429/524 |
| 6,911,412 B2 * | 6/2005 | Hampden-Smith et al. | 502/180 |
| 7,358,210 B2 * | 4/2008 | Tanaka et al. | 502/251 |
| 7,361,626 B2 * | 4/2008 | Baijense et al. | 502/329 |
| 7,435,274 B2 * | 10/2008 | Suenaga et al. | 48/127.9 |
| 7,563,747 B2 * | 7/2009 | Baijense et al. | 502/329 |
| 7,585,811 B2 * | 9/2009 | Nakamura et al. | 502/327 |
| 7,601,669 B2 * | 10/2009 | Nakamura et al. | 502/326 |
| 7,618,919 B2 * | 11/2009 | Shimazu et al. | 502/439 |
| 7,850,870 B2 * | 12/2010 | Ahn et al. | 252/500 |
| 7,851,399 B2 * | 12/2010 | Choi et al. | 502/216 |
| 2002/0006862 A1 * | 1/2002 | Schmidt | 502/150 |
| 2002/0039964 A1 * | 4/2002 | Tanaka et al. | 502/304 |
| 2006/0051657 A1 * | 3/2006 | Terada et al. | 429/44 |
| 2007/0155625 A1 * | 7/2007 | Yasuda et al. | 502/325 |
| 2007/0155626 A1 * | 7/2007 | Yasuda et al. | 502/329 |
| 2007/0191219 A1 * | 8/2007 | Fujita et al. | 502/302 |
| 2007/0203021 A1 * | 8/2007 | Nakamura et al. | 502/304 |
| 2007/0244001 A1 * | 10/2007 | Wakamatsu et al. | 502/303 |
| 2007/0292329 A1 | 12/2007 | Tanaka et al. | |

FOREIGN PATENT DOCUMENTS

| | | |
|---|---|---|
| EP | 2 135 672 A1 | 12/2009 |
| JP | 08-229404 A | 9/1996 |
| JP | 9-086928 A | 3/1997 |
| JP | 2005-306618 A | 11/2005 |
| JP | 2006-131457 A | 5/2006 |
| JP | 2006-326554 A | 12/2006 |
| JP | 2007-029863 A | 2/2007 |
| JP | 2007-130590 A | 5/2007 |
| JP | 2007-229641 A | 9/2007 |
| JP | 2007-313500 A | 12/2007 |

* cited by examiner

PURIFYING CATALYST

TECHNICAL FIELD

The present invention relates to a purifying catalyst. More specifically, the present invention relates to a purifying catalyst achieving good performance in purification of each component such as an oxidation of carbon monoxide (CO) and hydrocarbon (HC) and a reduction of nitrogen oxide (NOx), and relates to an exhaust gas purifying catalyst using the purifying catalyst.

BACKGROUND ART

Conventionally, a purifying catalyst containing noble metal as an essential component has been known. As such a purifying catalyst, an exhaust gas purifying catalyst containing a first catalytic component composed of noble metal, transition metal and an amorphous multi-chain structure clay mineral and a second catalytic component containing a composite oxide having a perovskite structure has been suggested (refer to Patent Citation 1). In addition, as such a purifying catalyst, an exhaust gas purifying catalyst using a noble metal-containing heat-resistant oxide obtained by performing a predetermined heat treatment to each raw material has been suggested (refer to Patent Citation 2). The purifying catalysts of the patent citations 1 and 2 have achieved necessary purification performance to some extent due to the use of noble metal.

Patent Citation 1: Japanese Patent Unexamined Publication No. H08-229404
Patent Citation 2: Japanese Patent Unexamined Publication No. 2006-131457

Meanwhile, a purifying catalyst not containing noble metal as an essential component has been studied and developed. As such a purifying catalyst, a catalyst adopting a perovskite-type composite oxide phase composed of a rare earth element and a transition element, in which a part of the transition element is substituted by zirconium (Zr) and molybdenum (Mo), has been suggested (refer to Patent Citation 3).

Patent Citation 3: Japanese Patent Unexamined Publication No. 2005-306618

DISCLOSURE OF INVENTION

However, there was a problem of the exhaust gas purifying catalyst described in Patent Citation 3 that could not achieve good purification performance.

The present invention has been made focusing on the above-described problems in the conventional art. An object of the present invention is to provide a purifying catalyst achieving good purification performance even when noble metal is not contained as an essential component, and provide an exhaust gas purifying catalyst adopting the purifying catalyst.

A purifying catalyst according to an embodiment of the present invention includes: catalyst powder composed of a transition metal oxide of which an average particle diameter is within 1 nm to 2 μm and in which an electron binding energy of oxygen is shifted to an energy side lower than 531.3 eV.

BEST MODE FOR CARRYING OUT THE INVENTION

Figure 1:
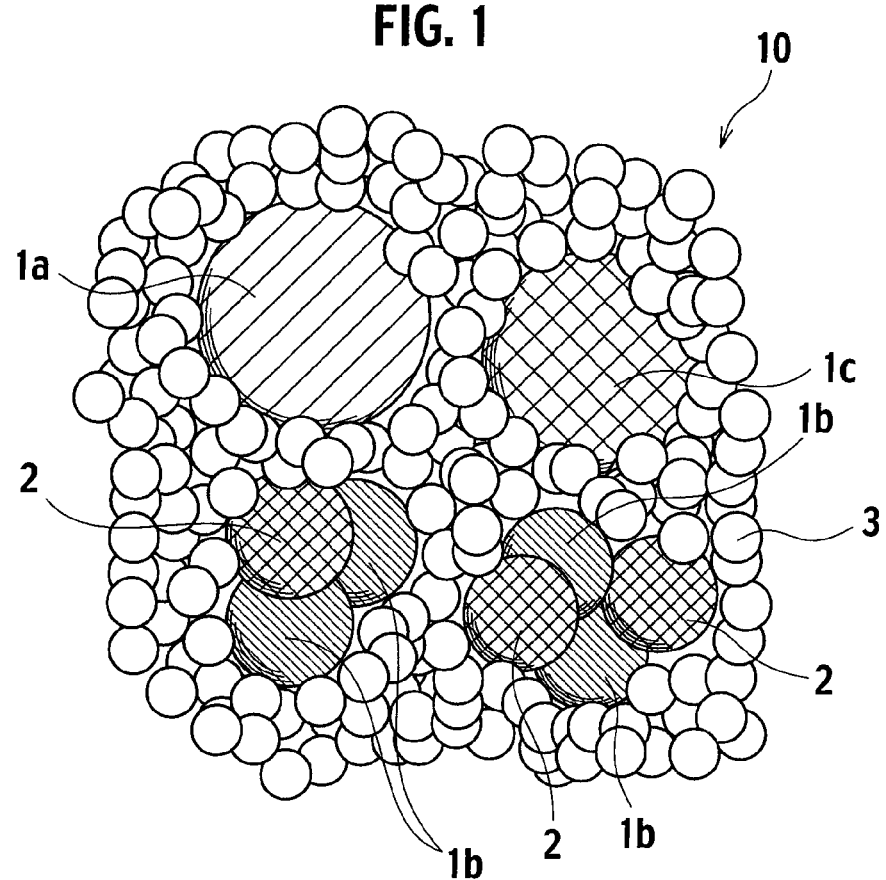
FIG. 1 is a schematic view showing a condition that transition metal oxides are dispersed in inorganic oxides.

A description will be made below in detail of a purifying catalyst according to the present invention. Note that, in the present description, claims and figures, "%" with regard to contents, concentrations and the like represents a mass percentage unless otherwise specified.

A purifying catalyst according to the present invention contains catalyst powder composed of a transition metal oxide of which an average particle diameter is within 1 nm to 2 μm and in which an electron binding energy of oxygen is shifted to an energy side lower than 531.3 eV. Due to such a feature, the purifying catalyst can achieve good purification performance even when the purifying catalyst does not contain noble metal.

The transition metal oxides can effectively function as active sites by having 1 nm to 2 μm of the average particle diameter and shifting the electron binding energy of oxygen in the oxides to the energy side lower than 531.3 eV. When the average particle diameter is less than 1 nm, the transition metal oxides do not effectively function as active sites. Similarly, when the average particle diameter is more than 2 μm, the transition metal oxides do not effectively function as active sites. Moreover, when the electron binding energy of oxygen is not shifted to the energy side lower than 531.3 eV, the transition metal oxides do not effectively function as active sites. Meanwhile, when the average particle diameter is between 0.1 μm to 1 μm, the transition metal oxides can function as active sites more effectively. Furthermore, when the average particle diameter is between 300 nm to 700 nm, the transition metal oxides can function as active sites much more effectively. Note that, "the average particle diameter" represents an average particle diameter (median diameter, D50) obtained by a dynamic light scattering method.

In addition, "the electron binding energy of oxygen is shifted to the energy side lower than 531.3 eV" represents a condition that a peak value of the binding energy is shifted to a lower energy side (less than 531.3 eV) than an electron binding energy of oxygen that the transition metal oxides can inherently have when an electron condition on surfaces of the transition metal oxides is measured by an X-ray photoelectron spectroscopy (XPS). Note that, the lower the electron binding energy of oxygen is, the more preferable it is. Specifically, the lower limit value is preferably around 527.5 eV.

As for the transition metal oxides, transition metal oxides containing manganese (Mn), iron (Fe), cobalt (Co), nickel (Ni), copper (Cu) or the like can be included. Moreover, transition metal oxides in which transition elements including an arbitrary combination of those components are mixed can be included. Typically, manganese oxide, iron oxide, cobalt oxide, nickel oxide, copper oxide and the like can be included. The transition metal oxides containing such transition elements can function as active sites more effectively by preparing the transition metal oxides having the above-mentioned average particle diameter and electron condition.

The above-mentioned transition metal oxides can be prepared by a precipitation method. Specifically, a solution of metallic salt of manganese (Mn), iron (Fe), cobalt (Co), nickel (Ni) and copper (Cu) is mixed while adding a precipitant, so as to produce a precipitate. Alternatively, the solution of metallic salt may be added into a solution of the precipitant, so as to produce the precipitate. As for the metallic salt, nitrate, sulfate, carbonate and the like of the transition metal can be used. As for the precipitant, a sodium hydroxide aqueous solution and ammonia can be used, thereby obtaining the precipitate composed of hydroxide. Next, in order to remove unnecessary components, the precipitate is repeatedly washed and filtered by distilled water and the like. Then, the washed precipitate is dried, followed by baking. Moreover, in order to make the average particle diameter into 1 nm to 2 μm, the baked transition metal oxides are milled. For milling, a ball mill and a bead mill can be used.

In addition, the transition metal oxides can be prepared by high-frequency induction heating. The high-frequency induction heating is a phenomenon in which transition metal itself produces heat by inserting the transition metal into a coil connected to an alternating-current power supply although the coil and the transition metal are separated from each other. Namely, high-density eddy current is generated adjacent to a surface of the transition metal as a heated object by alternating current, whereby the heated object produces heat due to Joule heat. The transition metal oxides evaporate the transition metal in oxygen gas by high-frequency induction heating. Then, the evaporated transition metal reacts with oxygen gas, thereby obtaining the transition metal oxides. The obtained transition metal oxides may be milled by a bead mill and the like, if necessary. High-frequency induction heating can be performed by use of a commercially available high-frequency induction-heating device.

As described above, the transition metal oxides can be prepared by use of the precipitation method and the high-frequency induction heating method. However, the transition metal oxides are not limited to those manufacturing methods. Any methods can be employed as long as the above transition metal oxides can be obtained.

The purifying catalyst preferably contains oxygen release materials capable of absorbing and releasing oxygen in exhaust gas in addition to the transition metal oxides. Due to such a configuration, the transition metal oxides can function as active sites more effectively. This can be because the amount of generated active oxygen from the oxygen release materials is increased due to an action of the high-active transition metal oxides at an interface between the transition metal oxides and the oxygen release materials. Alternatively, this can be also because the oxygen release materials provided adjacent to the transition metal oxides suppress change of atmosphere adjacent to the transition metal oxides. In other words, when the purifying catalyst is used as an exhaust gas purifying catalyst, for instance, it is considered that the electron binding energy of oxygen in the transition metal oxides is kept in the energy side lower than 531.3 eV due to the emission of oxygen by the oxygen release materials even it is under an atmosphere such as A/F<14.5 in which the oxygen amount in exhaust gas is low.

In the purifying catalyst, the oxygen release materials are preferably supported on the surfaces of the transition metal oxides, in which each particle is in contact with each other. In addition, the transition metal oxides and the oxygen release materials may be combined so as to form a solid solution. Obviously, in the purifying catalyst, some of the oxygen release materials may be supported on the surfaces of the transition metal oxides, and the other may form a solid solution with the transition metal oxides.

As for the oxygen release materials, a rare earth oxide including cerium (Ce), praseodymium (Pr), neodymium (Nd), yttrium (Y) or scandium (Sc) can be included. Moreover, as for the oxygen release materials, two or more kinds of the rare earth oxides may be mixed to be used. Furthermore, an oxide in which two or more kinds of the rare earth oxides are in a solid solution state may be used. Typically, cerium oxide, praseodymium oxide, neodymium oxide, yttrium oxide, scandium oxide and the like can be included. As for the rare earth oxide containing such rare earth elements, cerium oxide can be appropriately used. Namely, a higher oxygen emission ability can be obtained by combining cerium oxide and an oxide containing zirconium described later, whereby three-way performance with a wide window width may be obtained, for instance. As for another oxygen release material other than the rare earth oxide, bismuth oxide can be included, for instance.

The purifying catalyst may further contain inorganic oxides including zirconium (Zr), titanium (Ti), silicon (Si) or tungsten (W). Due to such a configuration, the transition metal oxides can function as active sites more effectively. As for the inorganic oxides, oxides such as zirconium oxide, titanium oxide, silicon oxide and tungsten oxide can be included. In addition, as for the inorganic oxides, any combination of zirconia, titania, silica or tungsten oxide may be mixed to be used. Furthermore, an oxide in which two or more kinds of the inorganic oxides are in a solid solution state may be used.

Zirconia, titania, silica and tungsten oxide are hard to form composite oxides (solid solution) with the transition metal oxides. Therefore, the transition metal oxides and the transition metal oxides supporting the oxygen release materials are preferably supported while being dispersed in the oxides. Specifically, as shown in FIG. 1, each transition metal oxide 1a is preferably embedded in a section partitioned by the inorganic oxides 3 such as zirconia, titania, silica and tungsten oxide. Thus, it is possible to prevent each transition metal oxide 1a from coming in direct contact with one another beyond each section partitioned by the inorganic oxides 3, and prevent each transition metal oxide 1a from being enlarged, due to the embedment of the transition metal oxides 1a in the sections partitioned by the inorganic oxides 3 in the purifying catalyst 10. Accordingly, it is possible to prevent a surface area of each transition metal oxide 1a from being reduced even in a high temperature condition, thereby promoting exhaust gas purification.

When the inorganic oxides 3 are porous, the inorganic oxides 3 may surround the whole particle of each transition metal oxide 1a. When the inorganic oxides 3 are not porous, there is a possibility that a contact ratio between each transition metal oxide 1a and exhaust gas is lowered when the inorganic oxides 3 surround the whole particle of each transition metal oxide 1a. Therefore, preferably, the particle of each transition metal oxide 1a is partly surrounded as shown in FIG. 1, so that the transition metal oxides 1a adjacent to each other do not come in direct contact with one another.

The following is a description of a method for manufacturing the purifying catalyst 10 containing the inorganic oxides 3. First, powder of the transition metal oxides 1a prepared as described above is dispersed in a solvent so as to obtain a slurry. Water can be used as a solvent. Next, another slurry in which precursors of the inorganic oxides 3 are dispersed in a solvent is prepared. As for the precursors, zirconia sol can be used when the inorganic oxides 3 are zirconia, titania sol can be used when the inorganic oxides 3 are titania, and silica sol can be used when the inorganic oxides 3 are silica. Next, the slurry in which the transition metal oxides 1a are contained in a fine powder state and the slurry of the precursors are mixed and rapidly stirred, so as to surround fine particles of the transition metal oxides 1a with the precursors of the inorganic oxides 3. Then, the slurry including the transition metal oxides 1a surrounded by the precursors is dried and baked, thereby obtaining the purifying catalyst 10.

Alternatively, a slurry prepared by milling the inorganic oxides 3 by a bead mill can be used, instead of the precursors. Specifically, the inorganic oxides 3 such as zirconia, titania, silica and tungsten oxide are milled by a bead mill so as to have a size of 500 nm or less, more specifically 60 to 150 nm, thereby preparing a slurry of the inorganic oxides 3. Next, the slurry of the inorganic oxides 3 and the slurry in which the transition metal oxides 1a are contained in a fine powder state are mixed and rapidly stirred, so as to surround the fine particles of the transition metal oxides 1a with fine particles of the inorganic oxides 3. Then, the slurry including the transition metal oxide fine particles surrounded by the fine particles of the inorganic oxides 3 is dried and baked, thereby obtaining the purifying catalyst 10.

Note that, the transition metal oxides surrounded by the inorganic oxides 3 may be transition metal oxides 1b on which the oxygen release materials 2 are supported, and may be solid solutions 1c composed of the transition metal oxides and the oxygen release materials, as shown in FIG. 1.

By containing the inorganic oxides as described above, the transition metal oxides can function as active sites more efficiently. For instance, it is possible to inhibit aggregation of the transition metal oxides and the transition metal oxides supporting the oxygen release materials, which may be caused by a long period of use under a high-temperature condition. Thus, the transition metal oxides can function as active sites more effectively even when being used for a long period under a high-temperature condition. In particular, zirconium oxide is preferably used as the inorganic oxides in view of stability under a high-temperature condition.

Figure 2:
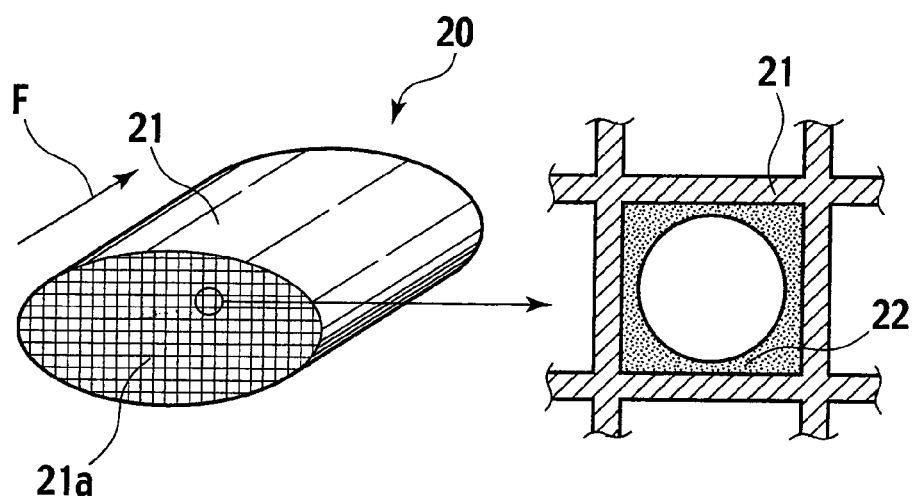
FIG. 2 is a schematic view showing an exhaust gas purifying catalyst provided with a catalyst layer containing the transition metal oxides.

The following is a description of an exhaust gas purifying catalyst according to the present invention. An exhaust gas purifying catalyst 20 according to the present invention is configured to have an integral structure-type substrate 21 provided with a plurality of cells 21a as shown in FIG. 2. Exhaust gas passes through each cell 21a along an exhaust gas passing direction F. Thus, exhaust gas is purified by contacting catalyst layers 22 provided in inner surfaces of each cell in a honeycomb substrate 21. Each catalyst layer 22 is provided with the purifying catalyst 10. Due to such a configuration, the transition metal oxides can effectively function as active sites, and good purification performance can be achieved even when not containing noble metal, with respect to exhaust gas e.g. from an automobile with high space velocity. Note that, as the integral structure-type substrate, a monolithic substrate and a honeycomb substrate formed of a heat-resistant material including ceramics such as cordierite and metal such as ferritic stainless are used.

The present invention will be described further in detail by the following examples and comparative examples. However, the scope of the invention is not limited to those examples.

Note that, in the following examples and comparative examples, an average particle diameter of the purifying catalyst was measured by use of a dynamic light scattering-type particle size distribution measuring apparatus (LB-550, manufactured by Horiba, Ltd.) performing a dynamic light scattering method. In addition, an electron condition (binding energy) on a surface of the purifying catalyst was measured by use of a composite-type surface analyzer (ESCA-5600, manufactured by Ulvac-PHI, Incorporated) performing an X-ray photoelectron spectroscopy.

Preparation for Purifying Catalyst

Example 1-1

Ammonia was dropped into a cobalt nitrate aqueous solution to form a precipitate, followed by filtering, washing, drying, baking and milling, thereby obtaining a purifying catalyst of this example composed of cobalt oxide ($CO_3O_4$).

The resultant cobalt oxide had an average particle diameter of 500 nm. With regard to a surface electron condition thereof, an electron binding energy of oxygen was shifted to a lower energy side. When measuring the binding energy, a peak value of the binding energy was 529.6 eV. This peak value had a lower energy condition than that of 531.5 eV of an electron binding energy of oxygen in cobalt oxide ($CO_3O_4$) manufactured by Wako Pure Chemical Industries Ltd.

Example 1-2

Ammonia was dropped into a cobalt nitrate aqueous solution to form a precipitate, followed by filtering, washing, drying, baking and milling, thereby obtaining a purifying catalyst of this example composed of cobalt oxide ($CO_3O_4$).

The resultant cobalt oxide had an average particle diameter of 1.140 μm. With regard to a surface electron condition thereof, an electron binding energy of oxygen was shifted to a lower energy side. When measuring the binding energy, a peak value of the binding energy was 529.5 eV. This peak value had a lower energy condition than that of 531.5 eV of an electron binding energy of oxygen in cobalt oxide ($CO_3O_4$) manufactured by Wako Pure Chemical Industries Ltd.

Comparative Example 1-1

For comparison, cobalt oxide ($CO_3O_4$) manufactured by Wako Pure Chemical Industries Ltd. was used for a purifying catalyst of this example. An average particle diameter of the cobalt oxide was 2.1 μm. When measuring a binding energy of the cobalt oxide by the above-mentioned apparatus, a peak value of the binding energy was 531.5 eV.

Figure 3:
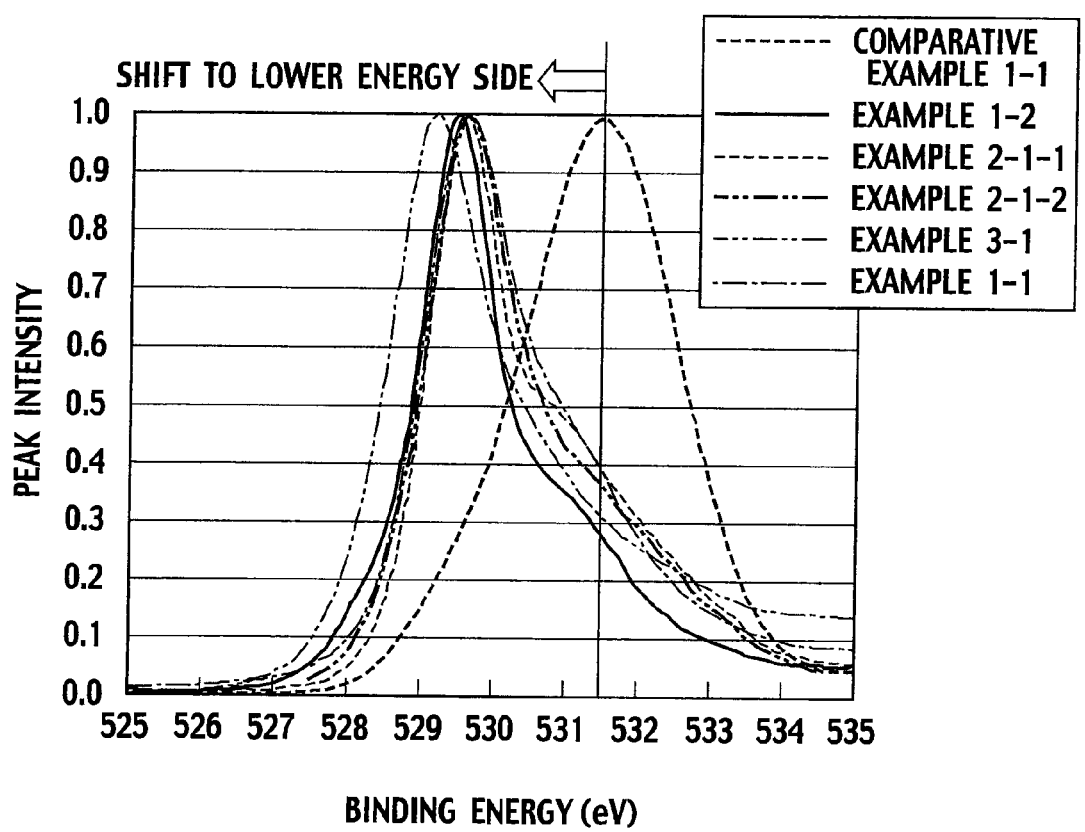
FIG. 3 is a graph showing measurement results in examples and comparative examples by use of an XPS.

FIG. 3 shows measurement results of Example 1-1, Example 1-2 and Comparative Example 1-1 by the XPS. Note that, measurement results of Example 2-1-1, Example 2-1-2 and Example 3-1 by the XPS are also shown in FIG. 3.

[Performance Evaluation]

<Oxidation Performance Evaluation of Carbon Monoxide>

Oxidation start temperatures of carbon monoxide were measured by use of the purifying catalysts of Example 1-1 and Comparative Example 1-1. Specifically, the oxidation start temperatures of carbon monoxide were measured with regard to the purifying catalysts of Example 1-1 and Comparative Example 1-1 of which BET specific surface areas were configured to be approximately the same. Note that, the specific surface areas of the respective purifying catalysts can be approximately the same by baking each purifying catalyst in air.

Figure 4:
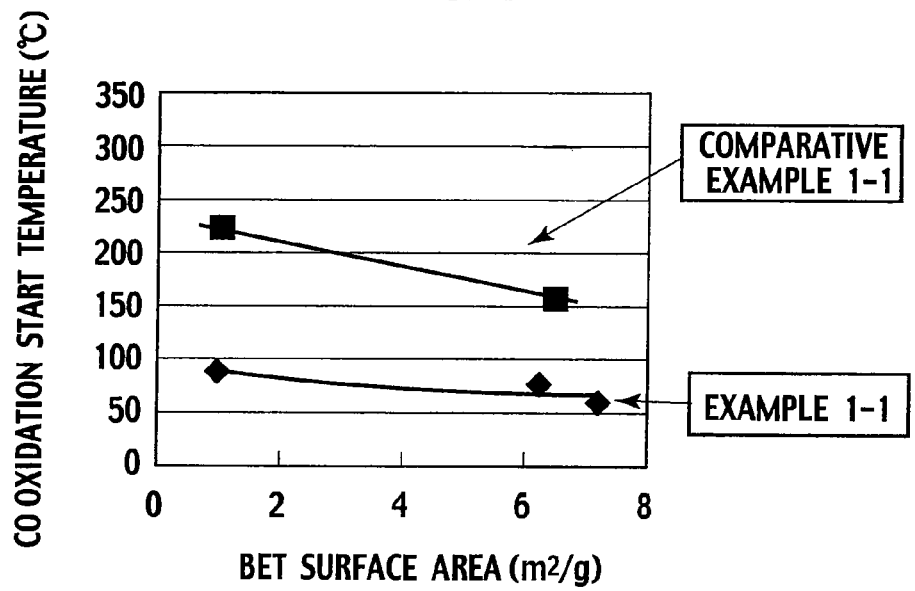
FIG. 4 is a graph showing measurement results of oxidation start temperatures of carbon monoxide in Example 1-1 and Comparative Example 1-1.

FIG. 4 shows measurement results of the oxidation start temperatures of carbon monoxide in each example. As shown in FIG. 4, it is recognized that Example 1-1 has a lower oxidation start temperature of carbon monoxide than Comparative Example 1-1 although both have approximately the same BET specific surface area. This is because the average particle diameter was within a predetermined range and the electron binding energy of oxygen in the transition metal oxides was shifted to an energy side lower than 531.3 eV in Example 1-1. Thus, it is presumed that oxygen was easily desorbed from the oxides, whereby absorbability of exhaust gas to transition metal was enhanced. Therefore, it is recognized that the purifying catalyst according to the present invention can achieve high oxidation performance of carbon monoxide even at low temperature.

Preparation for Exhaust Gas Purifying Catalyst

Example 2-1-1

90 g of cobalt oxide with the average particle diameter of 500 nm obtained in Example 1 was mixed with 10 g of zirconia sol in oxide conversion. Next, an acetic acid aqueous solution was added to the mixed sol, and shaken and milled with zirconia balls by a ball mill, thereby obtaining a catalyst slurry. Further, the catalyst slurry was coated on a honeycomb substrate, followed by removing redundant catalyst slurry by flowing air. Then, the honeycomb substrate coated with the slurry was dried at 120° C. in air and baked at 400° C. in air, thereby obtaining an exhaust gas purifying catalyst of this example. Note that, a ratio of cobalt oxide to zirconium oxide ($CO_3O_4:ZrO_2$) is 0.37 mol:0.08 mol. Note that, a material of the honeycomb substrate is cordierite, cell numbers are 900, a wall thickness is 2.5 mil, and a volume is 0.06 L.

When measuring a binding energy of cobalt oxide in the exhaust gas purifying catalyst of this example, a peak value of the binding energy was 529.6 eV. This peak value had a lower energy condition than that of 531.5 eV of an electron binding energy of oxygen in cobalt oxide ($CO_3O_4$) manufactured by Wako Pure Chemical Industries Ltd.

Example 2-1-2

Cobalt oxide with the average particle diameter of 500 nm obtained in Example 1 was mixed with zirconia sol. Next, an acetic acid aqueous solution was added to the mixed sol, and shaken and milled with zirconia balls by a ball mill, thereby obtaining a catalyst slurry. Further, the catalyst slurry was coated on the honeycomb substrate similar to Example 2-1-1, followed by removing redundant catalyst slurry by flowing air. Then, the honeycomb substrate coated with the slurry was dried at 120° C. in air and baked at 400° C. in air, thereby obtaining an exhaust gas purifying catalyst of this example. Note that, a ratio of cobalt oxide to zirconium oxide ($CO_3O_4:ZrO_2$) is 0.42 mol:0.32 mol.

When measuring a binding energy of cobalt oxide in the exhaust gas purifying catalyst of this example, a peak value of the binding energy was 529.5 eV. This peak value had a lower energy condition than that of 531.5 eV of the electron binding energy of oxygen in cobalt oxide ($CO_3O_4$) manufactured by Wako Pure Chemical Industries Ltd.

Comparative Example 2-1-1

Similar operations to those of Example 2-1-1 were repeated except that cobalt oxide with an average particle diameter of 2.1 μm manufactured by Wako Pure Chemical Industries Ltd. in Comparative Example 1-1 was used instead of cobalt oxide obtained in Example 1, thereby obtaining an exhaust gas purifying catalyst of this example.

Example 2-2-1

First, iron oxide (III) ($\gamma Fe_2O_3$) with an average particle diameter of 500 nm was prepared by evaporating iron by high-frequency induction heating in an oxygen gas atmosphere. Next, 90 g of the resultant iron oxide was mixed with 10 g of zirconia sol in oxide conversion. Next, an acetic acid aqueous solution was added to the mixed sol, and shaken and milled with zirconia balls by a ball mill, thereby obtaining a catalyst slurry. Further, the catalyst slurry was coated on the honeycomb substrate similar to Example 2-1-1, followed by removing redundant catalyst slurry by flowing air. Then, the honeycomb substrate coated with the slurry was dried at 120° C. in air and baked at 400° C. in air, thereby obtaining an exhaust gas purifying catalyst of this example. Note that, a ratio of iron oxide to zirconium oxide ($Fe_2O_3:ZrO_2$) was 5.64 mol:8.1 mol.

When measuring a binding energy of iron oxide (III) in the exhaust gas purifying catalyst of this example, a peak value of the binding energy was 529.6 eV. This peak value had a lower energy condition than that of 531.3 eV of the electron binding energy of oxygen in iron oxide (III) ($\gamma Fe_2O_3$) manufactured by Kojundo Chemical Laboratory Co., Ltd.

Example 2-2-2

First, iron oxide (III) ($\alpha Fe_2O_3$) with an average particle diameter of 500 nm was prepared by evaporating iron by high-frequency induction heating in an oxygen gas atmosphere. Next, 90 g of the resultant iron oxide was mixed with 10 g of zirconia sol in oxide conversion. Next, an acetic acid aqueous solution was added to the mixed sol, and shaken and milled with zirconia balls by a ball mill, thereby obtaining a catalyst slurry. Further, the catalyst slurry was coated on the honeycomb substrate similar to Example 2-1-1, followed by removing redundant catalyst slurry by flowing air. Then, the honeycomb substrate coated with the slurry was dried at 120° C. in air and baked at 400° C. in air, thereby obtaining an exhaust gas purifying catalyst of this example. Note that, a ratio of iron oxide to zirconium oxide ($Fe_2O_3:ZrO_2$) was 5.64 mol:8.1 mol.

When measuring a binding energy of iron oxide (III) in the exhaust gas purifying catalyst of this example, a peak value of the binding energy was 529.6 eV. This peak value had a lower energy condition than that of 531.3 eV of the electron binding energy of oxygen in iron oxide (III) ($\alpha Fe_2O_3$) manufactured by Kojundo Chemical Laboratory Co., Ltd.

Comparative Example 2-2-1

Similar operations to those of Example 2-2-1 were repeated except that $\gamma Fe_2O_3$ with an average particle diameter of 2.1 μm manufactured by Kojundo Chemical Laboratory Co., Ltd. was used instead of $\gamma Fe_2O_3$ obtained in Example 2-2-1, thereby obtaining an exhaust gas purifying catalyst of this example.

Example 3-1

First, a cobalt nitrate aqueous solution and a cerium nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of cerium oxide ($CeO_2$) and cobalt oxide ($Co_3O_4$). A ratio of cerium oxide to cobalt oxide ($CeO_2$:$Co_3O_4$) is 1 mol:16 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.2 eV. This peak value had a lower energy condition than that of 531.5 eV of an electron binding energy of oxygen in cobalt oxide ($Co_3O_4$) manufactured by Wako Pure Chemical Industries Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Example 3-2

First, a cobalt nitrate aqueous solution and a zirconium nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of zirconium oxide ($ZrO_2$) and cobalt oxide ($Co_3O_4$). A ratio of zirconium to cobalt (Zr:Co) is 1 mol:1 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.4 eV. This peak value had a lower energy condition than that of 531.5 eV of an electron binding energy of oxygen in cobalt oxide ($Co_3O_4$) manufactured by Wako Pure Chemical Industries Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Example 3-3

First, an iron nitrate aqueous solution and a cerium nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of iron oxide (III) ($Fe_2O_3$) and cerium oxide ($CeO_2$). A ratio of iron to cerium (Fe:Ce) is 1 mol:1 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.4 eV. This peak value had a lower energy condition than that of 531.3 eV of the electron binding energy of oxygen in iron oxide ($\gamma Fe_2O_3$) manufactured by Kojundo Chemical Laboratory Co., Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Example 3-4

First, an iron nitrate aqueous solution and a zirconium nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of iron oxide (III) ($Fe_2O_3$) and zirconium oxide ($ZrO_2$). A ratio of iron to zirconium (Fe:Zr) is 1 mol:1 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.5 eV. This peak value had a lower energy condition than that of 531.3 eV of the electron binding energy of oxygen in iron oxide ($\gamma Fe_2O_3$) manufactured by Kojundo Chemical Laboratory Co., Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Example 3-5

First, an iron nitrate aqueous solution and a praseodymium nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of praseodymium oxide ($Pr_2O_3$) and iron oxide (III) ($Fe_2O_3$). A ratio of iron to praseodymium (Fe:Pr) is 1 mol:1 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.6 eV. This peak value had a lower energy condition than that of 531.3 eV of the electron binding energy of oxygen in iron oxide ($\gamma Fe_2O_3$) manufactured by Kojundo Chemical Laboratory Co., Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Example 3-6

First, an iron nitrate aqueous solution and a bismuth nitrate aqueous solution were mixed, followed by dropping a sodium hydroxide aqueous solution so as to form a precipitate. Then, the precipitate was filtered, washed, dried, baked and milled, thereby obtaining a purifying catalyst of this example.

This purifying catalyst is an oxide composed of bismuth oxide (III) ($Bi_2O_3$) and iron oxide (III) ($Fe_2O_3$). A ratio of iron to bismuth (Fe:Bi) is 1 mol:1 mol. An average particle diameter of the purifying catalyst was 500 nm. In addition, the purifying catalyst had a surface electron condition in which an electron binding energy of oxygen was shifted to a lower energy side. When measuring the binding energy, a peak value of the binding energy was 529.3 eV. This peak value had a lower energy condition than that of 531.3 eV of the electron binding energy of oxygen in iron oxide ($\gamma Fe_2O_3$) manufactured by Kojundo Chemical Laboratory Co., Ltd.

Further, similar operations to those of Example 2-1-1 were repeated except that powder of the purifying catalyst of this example was used instead of cobalt oxide obtained in Example 2-1-1, thereby obtaining an exhaust gas purifying catalyst of this example.

Comparative Example 3-1

Similar operations to those of Example 2-1-1 were repeated except that cobalt oxide with an average particle diameter of 2.1 μm manufactured by Wako Pure Chemical Industries Ltd. was used instead of cobalt oxide obtained in Example 2-1-1, thereby obtaining an exhaust gas purifying catalyst of this example.

[Performance Evaluation]
<Three-Way Performance Evaluation>

Figure 5:
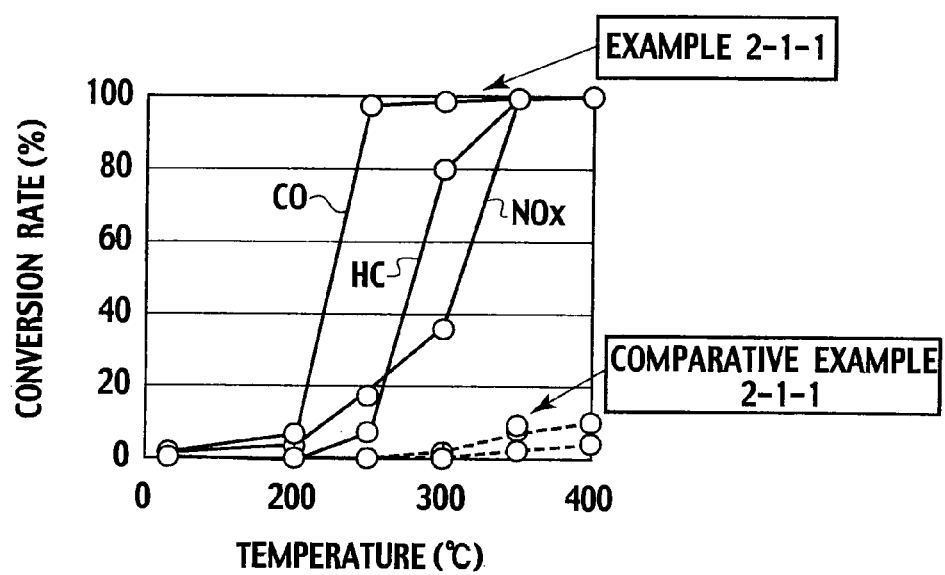
FIG. 5 is a graph showing measurement results of conversion rates of each component in Example 2-1-1 and Comparative Example 2-1-1.

Purification performance (conversion rate) for carbon monoxide (CO), hydrocarbon (HC) and nitrogen oxide (NOx) was measured by use of the purifying catalysts of Example 2-1-1 and Comparative Example 2-1-1. In particular, the conversion rates of CO, HC and NOx at each temperature were measured under the following measurement condition 1 with regard to the purifying catalysts of Example 2-1-1 and Comparative Example 2-1-1. FIG. 5 shows measurement results of the conversion rates of each component in Example 2-1-1 and Comparative Example 2-1-1.

(Measurement Condition 1)
Reactant gas flow amount: 40 L/minute
Z value of reactant gas: 0.97
A/F of reactant gas: 14.53
Composition of reactant gas (stoichiometric condition); NO: 1000, ppm, CO: 0.60 vol %, $H_2$: 0.20 vol %, $O_2$: 0.58 vol %, $CO_2$: 13.9 vol %, $C_3H_6$: 1665 ppmC, $H_2O$: 10 vol %, $N_2$: balance Note that, "ppmC" represents a carbon conversion. For instance, 1 ppm of benzene is 6 ppmC.

As shown in FIG. 5, it is recognized that Example 2-1-1 shows three-way performance under a stoichiometric condition. Meanwhile, Comparative Example 2-1-1 hardly shows three-way performance even under the stoichiometric condition. Thus, it is recognized that the purifying catalyst according to the present invention shows good three-way performance even when noble metal is not employed. Note that, Table 1 shows a specification of Example 2-1-1 to Example 2-2-2, Comparative Example 2-1-1 and Comparative Example 2-2-1, and purification performance (conversion rate) for CO, HC and NOx at 350° C.

TABLE 1

| | Catalyst Type | Average Particle Diameter (μm) | Electron Binding Energy of O1S (eV) | Purification Performance (Temperature: 350° C.) (%) | | |
|---|---|---|---|---|---|---|
| | | | | NOx | CO | HC |
| Example 2-1-1 | $Co_3O_4$ | 0.5 | 529.6 | 99 | 99 | 99 |
| Example 2-1-2 | $Co_3O_4$ | 0.5 | 529.5 | 90 | 99 | 99 |
| Comparative Example 2-1-1 | $Co_3O_4$ | 2.1 | 531.5 | 8 | 20 | 8 |
| Example 2-2-1 | $\gamma Fe_2O_3$ | 0.5 | 529.6 | 94 | 95 | 95 |
| Example 2-2-2 | $\alpha Fe_2O_3$ | 0.5 | 529.6 | 94 | 95 | 95 |
| Comparative Example 2-2-1 | $\gamma Fe_2O_3$ | 2.1 | 531.3 | 5 | 10 | 5 |

In addition, Table 2 shows a specification of Example 3-1 to Example 3-6 and Comparative Example 3-1, and purification performance (conversion rate) for CO, HC and NOx at 350° C. Note that, Table 2 also shows primary particle diameters of each example obtained by the BET method, and particle diameters (maximum particle diameter and minimum particle diameter) measured by an observation by use of a transmission electron microscope (TEM) with regard to some examples.

TABLE 2

| | Catalyst Type | Average Particle Diameter (μm) | Primary Particle Diameter by BET Method (nm) | Particle Diameter by TEM Observation (Minimum, Maximum) (nm) | Electron Binding Energy of O1S (eV) | Purification Performance (Temperature: 350° C.) (%) NOx | CO | HC |
|---|---|---|---|---|---|---|---|---|
| Example 3-1 | $Co_3O_4/CeO_2$ | 0.5 | 112 | — | 529.2 | 99 | 99 | 99 |
| Example 3-2 | $Co_3O_4/ZrO_2$ | 0.5 | 134 | — | 529.4 | 94 | 94 | 92 |
| Example 3-3 | $Fe_2O_3/CeO_2$ | 0.5 | 113 | 10,500 | 529.4 | 95 | 95 | 92 |
| Example 3-4 | $Fe_2O_3/ZrO_2$ | 0.5 | 136 | — | 529.5 | 95 | 95 | 93 |
| Example 3-5 | $Fe_2O_3/Pr_2O_3$ | 0.5 | 223 | 20,200 | 529.6 | 96 | 96 | 92 |
| Example 3-6 | $Fe_2O_3/Bi_2O_3$ | 0.5 | 713 | — | 529.3 | 94 | 94 | 93 |
| Comparative Example 3-1 | $Co_3O_4$ | 2.1 | — | — | 531.5 | 8 | 20 | 8 |

Figure 6:
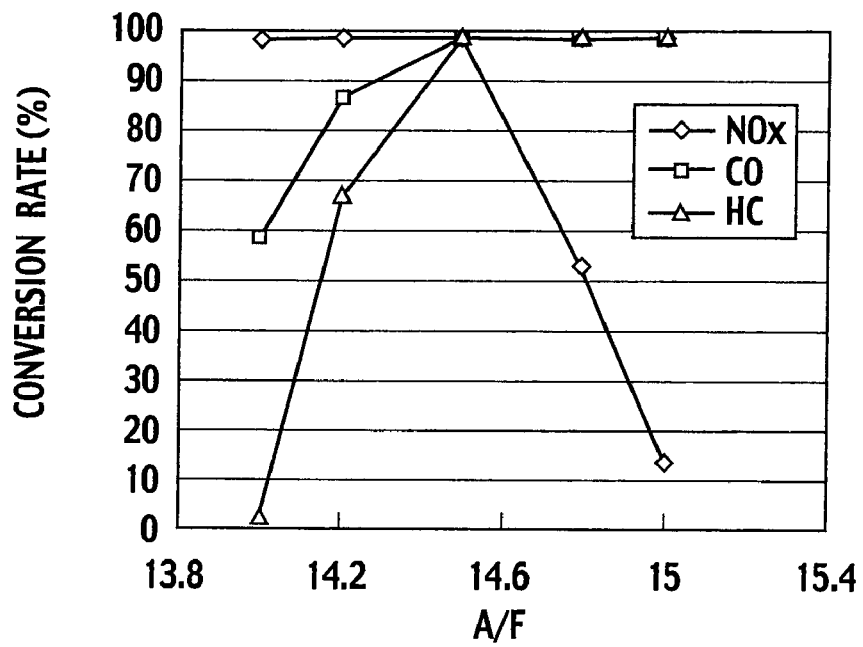
FIG. 6 is a graph showing measurement results of conversion rates of each component in Example 2-1-1.
Figure 7:
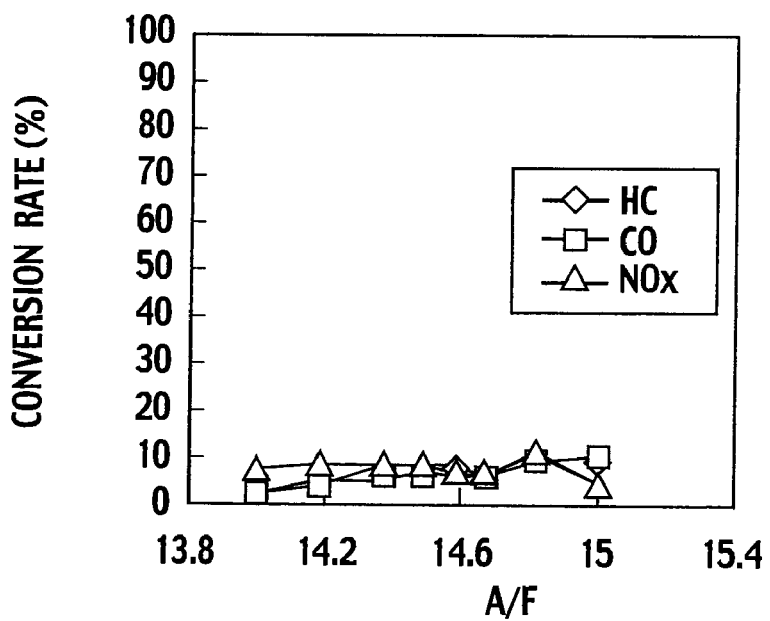
FIG. 7 is a graph showing measurement results of conversion rates of each component in Comparative Example 2-1-1.

Purification performance (conversion rate) for CO, HC and NOx was measured by use of the purifying catalysts of Example 2-1-1 and Comparative Example 2-1-1. In particular, the conversion rates of CO, HC and NOx at each A/F were measured under the following measurement condition 2 with regard to the purifying catalysts of Example 2-1-1 and Comparative Example 2-1-1. FIG. 6 shows measurement results of the conversion rates of each component in Example 2-1-1, and FIG. 7 shows measurement results of the conversion rates of each component in Comparative Example 2-1-1.

(Measurement Condition 2)

Reactant gas flow amount: 40 L/minute

Reactant gas (stoichiometric condition) [Z value: 0.97, A/F: 14.53, Composition; NO: 1000 ppm, CO: 0.60 vol %, $H_2$: 0.20 vol %, $O_2$: 0.58 vol %, $CO_2$: 13.9 vol %, $C_3H_6$: 1665 ppmC, $H_2O$: 10 vol %, $N_2$ (balance): residual]

Reactant gas (rich condition) [Z value: 0.28, A/F: 14.03, Composition; NO: 1000 ppm, CO: 1.30 vol %, $H_2$: 0.43 vol %, $O_2$: 0.27 vol %, $CO_2$: 13.9 vol %, $C_3H_6$: 1665 ppmC, $H_2O$: 10 vol %, $N_2$ (balance): residual]

Reactant gas (lean condition) [Z value: 2.08, A/F: 15.01, Composition; NO: 1000 ppm, CO: 0.60 vol %, $H_2$: 0.20 vol %, $O_2$: 1.30 vol %, $CO_2$: 13.9 vol %, $C_3H_6$: 1665 ppmC, $H_2O$: 10 vol %, $N_2$ (balance): residual]

As shown in FIGS. 6 and 7, it is recognized that Example 2-1-1 shows better three-way performance totally than Comparative Example 2-1-1. Moreover, it is recognized that three-way performance under rich condition is slightly lowered than three-way performance under stoichiometric condition in Example 2-1-1.

Although the invention has been described above by reference to a certain embodiment and examples, modifications and variations of the embodiment described above will occur to those skilled in the art, in light of the teachings. For instance, although the description has been made of the exhaust gas purifying catalyst for exhaust gas in the embodiment and examples, the present invention can be applied to a measure for a volatile organic compound (VOC) and the like as a catalyst material to replace noble metal. Moreover, although the description has been made of the purifying catalyst not containing noble metal in the embodiment and examples, the present invention can be applied to a purifying catalyst containing noble metal such as platinum, palladium and rhodium.

The entire contents of Japanese Patent Application No. P2007-322940 with a filing date of Dec. 14, 2007 and Japanese Patent Application No. P2008-256519 with a filing date of Oct. 1, 2008 are herein incorporated by reference.

INDUSTRIAL APPLICABILITY

According to the present invention, the particle diameter of the transition metal oxides has been set within a predetermined range, and the electron binding energy of oxygen has been shifted to the energy side lower than 531.3 eV. Therefore, it is possible to provide the purifying catalyst achieving good purification performance even when noble metal is not contained as an essential component, and provide the exhaust gas purifying catalyst adopting the purifying catalyst.

The invention claimed is:

1. A purifying catalyst, comprising:
   catalyst powder composed of a transition metal oxide of which an average particle diameter is within 1 nm to 2 μm and in which an electron binding energy of oxygen is shifted to an energy side lower than 531.3 eV; and
   an oxygen release material composed of a rare earth oxide containing at least one rare earth element selected from the group consisting of cerium, praseodymium, neodymium, yttrium and scandium,
   wherein the purifying catalyst does not contain noble metal.

2. The purifying catalyst according to claim 1,
   wherein the oxygen release material is supported on a surface of the transition metal oxide, or forms a solid solution with the transition metal oxide.

3. The purifying catalyst according to claim 1,
   wherein the transition metal oxide contains at least one transition element selected from the group consisting of manganese, iron, cobalt, nickel and copper.

4. The purifying catalyst according to claim 1, further comprising:
   an inorganic oxide that contains at least one element selected from the group consisting of zirconium, titanium, silicon and tungsten,
   wherein the transition metal oxide is supported while being dispersed in the inorganic oxide.

5. An exhaust gas purifying catalyst, comprising:
   a catalyst layer that includes the purifying catalyst according to claim 1; and
   an integral structure-type substrate provided with the catalyst layer in an inner surface thereof.

6. The purifying catalyst according to claim 1,
   wherein the transition metal oxide is iron oxide, and the rare earth oxide is praseodymium oxide.

7. A purifying catalyst, comprising:
   catalyst powder composed of a transition metal oxide of which an average particle diameter is within 1 nm to 2 μm and in which an electron binding energy of oxygen is shifted to an energy side lower than 531.3 eV; and
   an oxygen release material that is supported on a surface of the transition metal oxide, or forms a solid solution with the transition metal oxide,
   wherein the purifying catalyst does not contain noble metal.

* * * * *